United States Patent [19]
Hucks et al.

[11] Patent Number: 5,652,324
[45] Date of Patent: Jul. 29, 1997

[54] PROCESS FOR THE PRODUCTION OF THERMOPLASTIC POLYCARBONATE

[75] Inventors: Uwe Hucks, Alpen; Steffen Kühling, Meerbusch; Thomas Fischer, Krefeld; Gottfried Zaby, Leverkusen; Franz Ferdinand Rhiel, Dormagen, all of Germany

[73] Assignee: Bayer Aktiengesellschaft, Leverkusen, Germany

[21] Appl. No.: 556,407

[22] Filed: Nov. 13, 1995

[30] Foreign Application Priority Data

Nov. 21, 1994 [DE] Germany ............ 44 41 355.6

[51] Int. Cl.$^6$ .................................................. C08G 64/00
[52] U.S. Cl. ........................ 528/196; 528/199; 528/201
[58] Field of Search ............................... 528/196, 199, 528/201

[56] References Cited

FOREIGN PATENT DOCUMENTS

| 388085 | 10/1989 | European Pat. Off. . |
| 582931 | 8/1993 | European Pat. Off. . |
| WO92 04394 | 3/1992 | WIPO . |

OTHER PUBLICATIONS

"Chemistry and Physics of Polycarbonates" Polymer Reviews, H. Schnell, vol. 9. (1964).

*Primary Examiner*—Terressa Mosley
*Attorney, Agent, or Firm*—Connolly and Hutz

[57] ABSTRACT

The invention relates to a transesterification process for the production of thermoplastic, solventless oligo-/polycarbonates in which aromatic diphenols and carbonic acid diaryl esters are combined and reacted in gaseous form.

10 Claims, No Drawings

PROCESS FOR THE PRODUCTION OF THERMOPLASTIC POLYCARBONATE

This invention relates to a transesterification process for the production of solventless oligo-/polycarbonates from aromatic diphenols, carbonic acid diaryl esters, optionally branching agents and/or monophenols and optionally catalysts at temperatures of 80° C. to 400° C. under absolute pressures of 1,000 mbar to 0.01 mbar, characterized in that the aromatic diphenols and the carbonic acid diaryl esters are reacted in gaseous form in the first phase of the transesterification (oligocarbonate production).

The oligo-/polycarbonates produced by the process according to the invention are solvent-free, light in color and substantially free from unwanted defects in the polycarbonate.

The production of aromatic oligo-/polycarbonates by the melt transesterification process is known from the literature and is described, for example, in Chemistry and Physics of Polycarbonates, Polymer Reviews, H. Schnell, Vol. 9, John Wiley and Sons. Inc. (1964).

In the literature references and the literature cited therein, solid educts (aromatic diphenols, carbonic acid diaryl esters) are always melted and reacted to form the polycarbonate.

It has now surprisingly been found that the reaction can be completed quickly by combining the aromatic diphenol with the carbonic acid diaryl ester in the gas phase. This has the particular advantage that, immediately after purification by distillation, the educts may be used in extremely high quality with no need for further steps. Isolation and subsequent remelting are unnecessary.

Diphenols suitable for the process according to the invention correspond to formula (I):

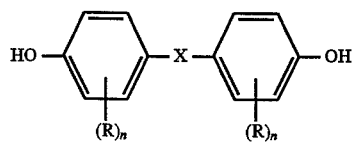

in which X=$C_{1-8}$ alkylidene or cycloalkylidene, S or a single bond and R=$CH_3$, Cl or Br and n=0, 1 or 2.

Preferred diphenols are, for example, 4,4'-dihydroxydiphenyl, 4,4'-dihydroxydiphenyl sulfide, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

Of the diphenols mentioned above, 2,2-bis-(4-hydroxyphenyl)-propane and 1,1-bis-(4-hydroxyphenyl)-3,3,5-trimethyl cyclohexane are particularly preferred.

The diphenols mentioned above may be used for the production of homopolymers or copolymers.

The polycarbonates may be intentionally and controllably branched by the use of small quantities of branching agents. Suitable branching agents include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenol)-orthoterephthalic acid ester, tetra-(4-hydroxyphenyl)-methane, tetra-(4-(4-hydroxyphenylisopropyl)-phenoxy)-methane, 1,4-bis-(4',4"-dihydroxytriphenyl)-methyl)-benzene and, more particularly, α,α',α"-tris(4-hydroxyphenyl)-1,3,5-triisopropyl benzene.

Other possible branching agents are 2,4-dihydroxybenzoic acid, trimesic acid, cyanuric chloride and 3,3-bis-(3-methyl-4-hydroxyphenyl)-2-oxo-2,3-dihydroindole.

The 0.05 to 2 mole-%, based on diphenols used, of branching agents optionally used may be used together with the diphenols or, preferably, may be added at a later stage of the oligo-/polycondensation.

Carbonic acid diesters in the context of the present invention are di-$C_{6-18}$-aryl esters, halogen-substituted $NO_2$-substituted carbonic acid diesters, preferably the diesters of phenol or alkyl-substituted phenols, i.e. diphenyl carbonate or, for example, dicresyl carbonate. The carbonic acid diesters are used in quantities of 1.01 to 2 moles, preferably in quantities of 1.02 to 1.30 moles and more preferably in quantities of 1.03 to 1.15 moles per mole of bisphenol.

In the process according to the invention, the aromatic dihydroxy compound and the carbonic acid diesters may be vaporized for the gas-phase reaction or, preferably, combined in gaseous form after the purification process (distillation).

The gas-phase reaction by which the oligocarbonate is formed takes place in the absence of a catalyst. However, nitrogen and phosphorus bases, for example ammonium, and phosphonium catalysts (cf. III, IV) and also guanidine and phosphazene bases, may be used with advantage as catalysts for the gas-phase reaction leading to the oligocarbonate. These catalysts may also be brought into the gas phase or may be fixed to a support material as fixed-bed catalysts.

Preferred catalysts for use in the process according to the invention for the production of the oligocarbonate stage are compounds corresponding to general formulae (III) and (IV):

in which $R_{1-4}$ may be the same or different and represent alkyl, aryl or cycloalkyl radicals and $X^-$ may be an anion in which the corresponding acid/base pair $H^+ + X^- \rightleftharpoons HX$ has a $pK_B$ of <11.

Examples of catalysts suitable for use in the process according to the invention are ammonia, tetramethylammonium hydroxide, tetramethylammonium acetate, tetramethylammonium fluoride, tetramethylammonium tetraphenyl boranate, tetraphenyl phosphonium fluoride, tetraphenyl phosphonium tetraphenyl boranate, dimethyl diphenylammonium hydroxide, tetraethylammonium hydroxide, DBU, DBN or guanidine systems, such as for example 1,5,7-triazabicyclo-[4,4,0]-dec-5-ene, 7-phenyl-1,5,7-triazabicyclo-[4,4,0]-dec-5-ene, 7-methyl-1,5,7-triazabicyclo-[4,4,0]-dec-5-ene, 7,7'-hexylidene-di-1,5,7-triazabicyclo-[4,4,0]-dec-5-ene, 7,7'-decylidene-di-1,5,7-triazabicyclo-[4,4,0]-dec-5-ene, 7,7'-dodecylidene-di-1,5,7-triazabicyclo-[4,4,0]-dec-5-ene, or phosphazenes, such as for example the phosphazene base $P_1$-t-oct= tert.octyliminotris-(dimethylamino)-phosphorane, phosazenebase $P_1$t-butyl=tert.butyliminotris-(dimethylamino)- phosphorane, BEMP=2-tert.butylimino-2-diethylamino-1,3-dimethylperhydro- 1,3-diaza-2-phosphorine.

These catalysts are used in quantities of $10^{-1}$ to $10^{-8}$ moles per mole of diphenol. The catalysts may also be used in combination (two or more) with one another.

Fixed-bed catalysts and support materials for the above-mentioned catalysts are glass, zeolites, aluminium oxides, active carbons, metals/alloys, ceramics and polymeric supports.

For the uncatalyzed reaction, it is of advantage to create a large surface for the gas-phase reaction. This can be guaranteed by passing the gas mixture over such materials as glass, zeolites, active carbons, inert metals/alloys (for example V4A, Hastelloy) which offer a large surface through corresponding geometric forms (for example, spheres, gauzes, powders, rings, granules, pellets).

The oligocarbonates produced by the gas-phase reaction have average molecular weights $\overline{M}_w$ of 300 to 24,000 and preferably 400 to 19,000, as determined by measurement of the relative solution viscosity in dichloromethane or in mixtures of equal quantities by weight of phenol and o-dichlorobenzene calibrated by light scattering.

The temperature for the production of the oligocarbonates is in the range from 100° C. to 350° C. and preferably in the range from 150° C. to 280° C. The monophenols formed in the transesterification leading to the oligocarbonate are removed by application of an absolute pressure of 1 bar to 0.5 mbar and preferably <500 mbar to 1 mbar. However, a low partial pressure can also be established by using corresponding quantities of a carrier gas (inert gas such as, for example, nitrogen, argon, carbon dioxide, steam).

In the process according to the invention, the reaction of the aromatic dihydroxy compound and the carbonic acid diester to form the oligocarbonate may be carried out discontinuously or, preferably, continuously. To this end, the gases of the aromatic dihydroxy compound and the carbonic acid diester are mixed and reacted by suitable technical means (for example by means of a nozzle, mixing elements, passage over such materials as glass, zeolites, active carbons, inert metals/alloys which offer a large mixing surface through appropriate geometric forms (for example spheres, gauzes, powders, rings, granules, pellets). The reaction may be carried out, for example, in a simple heated tube or in a packed reaction column (packing: glass, zeolites, active carbons, inert metals/alloys, ceramics, supported catalysts in appropriate forms (for example spheres, gauzes, powders, rings, granules, pellets).

The residence times of the aromatic dihydroxy compound and the carbonic acid diester in the gas-phase reaction leading to the oligocarbonate in the process according to the invention are much shorter by comparison with the liquid-phase reaction (1 h to 5 h), being less than 1 h, preferably less than 0.5 h and, more preferably, less than 15 minutes.

The oligocarbonate may then be further reacted, for example, by introduction into stirred tank reactors, thin layer evaporators, reaction columns, loop reactors, tube coils with flash evaporation, falling film evaporators, cascades of stirred tank reactors, simple disk reactors.

The oligocarbonate is converted into the polycarbonate by a further increase in temperature to 250°–400° C. and preferably 280°–320° C. under a pressure of <100 mbar to 0.01 mbar.

It can be of advantage to add alkali metal/alkaline earth metal catalysts for this step. The alkali metal/alkaline earth metal catalysts are preferably used in quantities of $10^{-8}$ to $10^{-4}$ moles per mole of diphenol and, more preferably, in a concentration of $10^{-7}$ to $10^{-5}$ moles. Examples of corresponding catalysts are lithium, sodium, potassium caesium, calcium, barium, magnesium hydroxides, carbonates, halides, phenolates, diphenolates, fluorides, acetates, phosphates, hydrogen phosphates, boranates.

The alkali metal/alkaline earth metal catalyst may be added, for example, as a solid or as a solution or master batch in water, phenol, oligocarbonate, polycarbonate.

In the process according to the invention, the polycondensation of the oligocarbonate may be carried out continuously or discontinuously, for example in stirred tank reactors, thin layer evaporators, cascades of stirred tank reactors, extruders, kneaders, disk reactors and/or high-viscosity disk reactors.

The aromatic polycarbonates of the process according to the invention should have average weight average molecular weights $\overline{M}_w$ in the range from 18,000 to 60,000 and preferably in the range from 19,000 to 40,000, as determined by measurement of the relative solution viscosity in dichloromethane or in mixtures of equal quantities by weight of phenol and o-dichlorobenzene calibrated by light scattering.

This is done by polycondensing preferably low molecular weight oligocarbonates by monophenol distillation to relatively low-viscosity polycarbonates and relatively high molecular weight oligocarbonates to relatively high-viscosity polycarbonates.

The reaction of the oligocarbonate to form the polycarbonate may also be carried out in accordance with WO 90/7536 or EP-A 338 085 by crystallizing the oligocarbonate produced in accordance with the invention and subjecting it to polycondensation in the solid phase.

The aromatic polycarbonates of the process according to the invention should have average weight average molecular weights $\overline{M}_w$ in the range from 18,000 to 60,000 and preferably in the range from 19,000 to 40,000, as determined by measurement of the relative solution viscosity in dichloromethane or in mixtures of equal quantities by weight of phenol and o-dichlorobenzene calibrated by light scattering.

The polycarbonates produced in accordance with the invention are light in color, preferably have a low terminal OH group content of <1,200 ppm and are resistant to hydrolysis and heat.

To limit the average weight average molecular weights $\overline{M}_w$ of the polymers, molecular weight regulators such as, for example, alkylphenol (isooctylphenol, t-butylphenol, cumylphenol) may be used in the necessary quantities in known manner (EP 360 578).

Auxiliaries and reinforcing materials may be added to the polycarbonates produced in accordance with the invention to improve their properties. Suitable auxiliaries and reinforcing materials include stabilizers (for example UV, heat, gamma-ray stabilizers), antistatic agents, flow aids, mold release agents, flameproofing agents, pigments, fine-particle minerals, fibers, for example alkyl and aryl phosphites, phosphates and phosphanes, low molecular weight carboxylic acid esters, halogen compounds, salts, chalk, silica flour, glass and carbon fibers, acids and epoxides.

Other polymers, for example polyolefins, polyurethanes, polystyrene, may also be mixed with the polycarbonates according to the invention.

These substances are preferably added to the final polycarbonate in conventional units although, if necessary, they may also be added at any other stage of the process according to the invention.

In addition, the polycarbonates may be modified for special applications by co-condensation of blocks, segments and comonomers, for example OH-terminated siloxane blocks, aromatic and aliphatic OH- and carboxylic-acidterminated polyesters, OH-terminated polyphenylene sulfide blocks, OH-terminated polyphenylene oxide blocks.

The polycarbonates produced in accordance with the invention are suitable for the usual applications, i.e. in electrical engineering, in the building field and in automobile construction, for example as a support material for data storage media, for double-walled panels for covering purposes or as a housing material for electronic equipment.

EXAMPLES

Example 1

1 kg of bisphenol A and 1 kg of diphenyl carbonate are separately weighed into two oil-heated vessels and melted under nitrogen. Arranged on the oil-heated vessels are two heated connecting tubes which open into a heated glass tube (filled with glass rings). The glass tube (30 cm long and 7.5 cm in diameter) terminates in a 2 liter two-necked flask (heated) with a product outlet and surmounted by a bridge. The bisphenol A is heated to 290° C. and the diphenyl carbonate to 250° C. The heated glass tube is heated to 230° C. and the 2 liter two-necked flask to 210° C. The pressure is then continuously reduced to 40 mbar so that the bisphenol A and the diphenyl carbonate boil uniformly. The uniform boiling may have to be adjusted by readjustment of the educt temperatures. Synthesis of the oligocarbonate then takes place in the heated glass tube, so that the oligocarbonate separates in the 2 liter two-necked flask. The phenol eliminated is continuously removed through a bridge. The oligocarbonate with a relative solution viscosity of 1.038 (dichloromethane, 25° C., 5 g/l) is discharged into a flask equipped with a stirrer, internal thermometer and Vigreux column (30 cm, reflective) and, at the same time, the temperature is increased over a period of 1 hour to 250° C. and the vacuum lowered to 10 mbar. By further lowering the vacuum to 0.5 mbar and increasing the temperature to 280° C., polycondensation is completed over a period of 1 hour. A solventless light-colored polycarbonate with a relative solution viscosity of 1.230 (dichloromethane, 25° C., 5 g/l) is obtained. The polycarbonate has a phenolic OH value of 510 ppm.

Example 2

As Example 1, except that V4a gauze rings are used instead of the glass rings. The oligocarbonate obtained has a relative solution viscosity of 1.045 (dichloromethane, 25° C., 5 g/l) and gives a light-colored, solventless polycarbonate with a relative solution viscosity of 1.254 (dichloromethane, 25° C., 5 g/l). The polycarbonate has a phenolic OH value of 360 ppm.

Example 3

As Example 1, except that 0.0001 g of NaOH ($5 \cdot 10^{-4}$ mole-%), based on bisphenol A, in the form of a 1% aqueous solution is added to the oligocarbonate. A light-colored, solventless polycarbonate with a relative solution viscosity of 1.299 (dichloromethane, 25° C., 5 g/l) is obtained. The polycarbonate has a phenolic OH value of 280 ppm.

We claim:

1. A process for the production of thermoplastic, solventless oligo-/polycarbonates, from aromatic diphenols and carbonic acid diaryl esters, which comprises providing the aromatic diphenols and carbonic acid diaryl esters in gaseous form, and combining and reacting the gaseous aromatic diphenols and gaseous carbonic acid diaryl esters at a temperature of 80° C. to 400° C. under an absolute pressure of 1,000 mbar to 0.01 mbar.

2. A process as claimed in claim 1, characterized in that the diphenol is bisphenol A and the carbonic acid diaryl ester is diphenyl carbonate.

3. A process as claimed in claim 1, characterized in that the gas-phase reaction is carried out in the presence of basic or neutral catalysts.

4. A process as claimed in claim 1, characterized in that the oligocarbonates or polycarbonates produced by the gas-phase reaction have average molecular weights $\overline{M}_w$ of 300 to 24,000.

5. A process as claimed in claim 1, characterized in that the residence time for the oligocarbonate synthesis is less than 1 h.

6. A process as claimed in claim 3, characterized in that the catalyst is a fixed-bed catalyst.

7. A process for the production of thermoplastic, solventless oligo-/polycarbonates, which comprises providing bisphenol A and diphenyl carbonate in gaseous form and combining the gaseous reactants in a reaction zone at temperatures of 80° C. to 400° C. and under absolute pressures of 1,000 mbar to 0.01 mbar, with the residence time in the reaction zone being less than 1 hour.

8. The process according to claim 7, wherein the temperature is 150° C. to 280° C.

9. The process of claim 1, wherein oligocarbonates are formed during the reaction, and wherein the process further comprises polycondensing the oligocarbonates into polycarbonates.

10. The process of claim 9 wherein the polycondensation is carried out at a temperature of 250°–400° C. at a pressure of 0.01 to 100 mbar.

* * * * *